United States Patent [19]
Lacey

[11] 3,804,434
[45] Apr. 16, 1974

[54] SEAT BELT CLAMPING DEVICE
[75] Inventor: Robert Ronald Lacey, Kingsthorpe, England
[73] Assignee: Universal Oil Products Company, Des Plaines, Ill.
[22] Filed: July 12, 1972
[21] Appl. No.: 271,325

[30] Foreign Application Priority Data
July 16, 1971 Great Britain.................... 33512/71

[52] U.S. Cl. ........................... 280/150 SB, 297/385
[51] Int. Cl. ............................................. B60r 21/10
[58] Field of Search.................. 280/150 SB, 150 B; 296/65 A; 297/384, 385, 389, 390, 388

[56] References Cited
UNITED STATES PATENTS

| | | | |
|---|---|---|---|
| 3,560,048 | 2/1971 | Flint.............................. | 297/385 X |
| 3,582,133 | 6/1971 | DeLavenne........................ | 297/390 |
| 3,737,197 | 6/1973 | Hall et al. ......................... | 297/385 |
| 3,439,952 | 4/1969 | Jantzen.............................. | 297/388 |
| 3,230,009 | 1/1966 | Schmidt............................. | 297/388 |
| 3,369,768 | 2/1968 | Burns................................ | 297/388 |

FOREIGN PATENTS OR APPLICATIONS

| | | | |
|---|---|---|---|
| 1,150,849 | 4/1956 | France............................. | 296/65 A |
| 1,906,813 | 8/1970 | Germany....................... | 280/150 SB |

*Primary Examiner*—Richard J. Johnson
*Assistant Examiner*—Reinhard J. Eisenzopf
*Attorney, Agent, or Firm*—James R. Hoatson, Jr.; Barry L. Clark; William H. Page, II

[57] ABSTRACT

Seat belt clamping device for use with floor mounted seat belts and a resiliently suspended vehicle seat includes pairs of spring biased clamping bars mounted on each side of the seat. The lap belts pass through the clamping bars and are frictionally held thereby so that the portions of the belts contacting the occupant's lap will remain taut while the portions of the belts between the clamps and the floor anchors can alternately tighten and loosen as the seat moves up and down over its range of resilient movement.

6 Claims, 2 Drawing Figures

SEAT BELT CLAMPING DEVICE

BACKGROUND OF THE INVENTION

The present invention relates to a vehicle seat mounted on a resilient suspension for upward and downward movement.

With resiliently mounted vehicle seats, a seat belt, which comprises a lap strap passed around the front of a seat occupant and anchored at its end portions to the floor of the vehicle adjacent the sides of the seat, is likely to chafe across the lap of the occupant as it alternately tightens and loosens during upward and downward movement of the seat. Since such chafing will cause discomfort and wear to the clothes of the occupant, it would be desirable to provide a seat belt in which movement of the lap strap across the lap of the occupant during movement of the seat on its suspension is substantially prevented.

SUMMARY

According to the present invention, there is provided a vehicle seat mounted for upward and downward movement on a resilient suspension, and a clamping device at each side of the seat operative to clamp a seat belt to the seat with a force sufficient to hold the belt taut across a seat occupant while the end portions of the belt between the clamping devices and the floor mounting bolts are free to flex to accommodate the up and down movement of the suspension.

Still further according to the present invention, there is provided a vehicle seat mounted on a resilient suspension for upward and downward movement, and a friction clamping device mounted on the seat at each side thereof for clamping a lap strap of a seat belt. Preferably, a force of approximately 8 pounds is applied although the force can be adjusted. The clamping surface is much wider than the lap strap so that the strap may be adjusted by the occupant to accommodate various fore and aft position adjustments of the seat.

BRIEF DESCRIPTION OF THE DRAWINGS

An embodiment of the invention will now be described, by way of example only, and with reference to the accompanying diagrammatic drawings, in which.

DESCRIPTION OF THE PREFERRED EMBODIMENT

Figure 1:
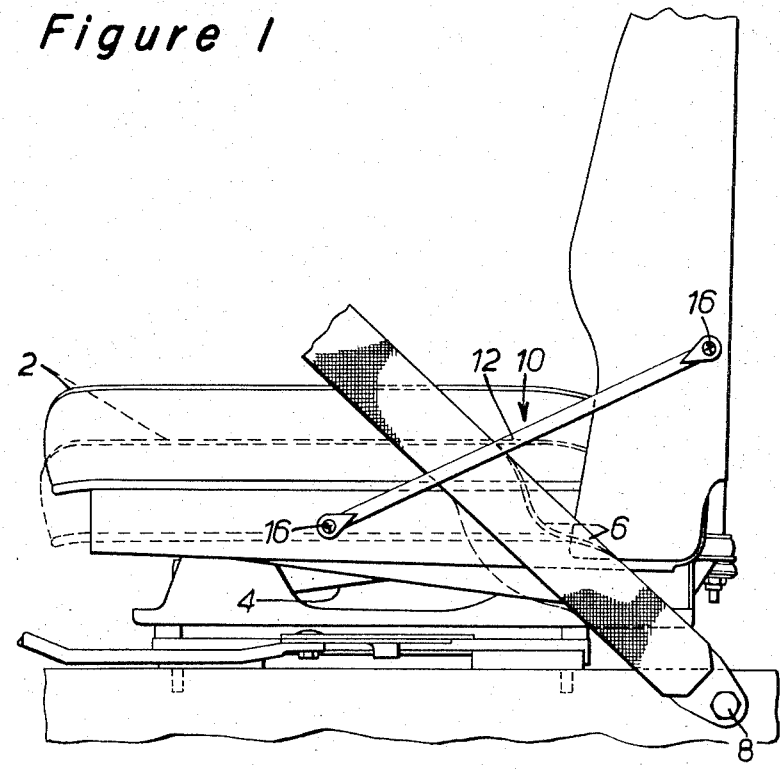
FIG. 1 is a side elevation of a resiliently suspended vehicle seat in accordance with the invention; (shown in its upper position)

As shown in the drawings, a vehicle seat 2 is mounted on a resilient suspension 4 for upward and downward movement relative to the floor of the vehicle; suitably, the suspension 4 comprises a crossed-arm linkage which supports the seat from a base plate, the linkage being biased by means of a torsion bar or other spring to move the seat 2 into an UP-stop position as shown in solid lines. The DOWN-stop position is shown in dotted lines. A seat belt assembly for use with the seat comprises a lap strap 6 anchored at each end portion 8 to the floor of the vehicle. The strap 6 is clamped at each side of the seat 2 by a clamping device 10 which is spring loaded to provide a relatively low clamping force (approximately eight pounds) but which is sufficient to hold the strap 6 taut across the lap of the occupant when the seat is at a lower position where the anchored end of the strap is not taut. The clamping force is sufficiently low to permit the strap to be readily pulled by the occupant through the clamping devices to permit adjustment of the position of the strap in the clamping device.

Figure 2:
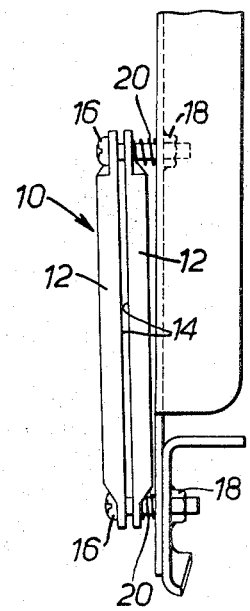
FIG. 2 is a fragmentary rear elevation of the seat.

As shown in greater detail in FIG. 2, each clamping device 10 comprises a pair of substantially parallel clamping bars 12 having opposed, flat, clamping faces 14. At each end portion, the bars 12 are slidably mounted on a screw 16 extending through an aperture in the seat frame and engaged with a nut 18 welded to the inner surface of the seat frame. A compression spring 20 is mounted on the shank of each screw 16 between the seat frame and the inner clamping bar whereby to bias the inner clamping bar towards the outer clamping bar; the springs 20 thus provide the clamping force. As will be apparent, by appropriately rotating the screws 16, the compression of the springs 20, and thus the clamping force, can be varied.

In use, the strap 6 passes between the bars 12 at each side of the seat and is clamped by the bars taut across the lap of the seat occupant. During movement of the seat 2 on its suspension 4, movement relative to the seat of that portion of the strap extending across the lap of the occupant is prevented by the frictional force exerted by the clamping bars 12 at each side of the seat 2, only the end portions of the strap extending between the clamping bars 12 and the anchoring points 8 moving with movement of the seat 2.

When the seat 2 is adjusted horizontally relative to the floor of the vehicle, for example by being moved along slide rails, only one corresponding adjustment of the belt is necessary, the belt being adjusted to the correct tension whilst the seat is in its UP-stop position; for this latter purpose, the seat 2 is preferably provided with a suspension lock. The length of the bars 16 is considerably greater than the width of the strap 6 to permit angular movement of the strap 6 about the anchoring points during the aforesaid horizontal adjustment and also to accommodate such variations in the location of the anchoring points relative to the seat as are likely to occur in different vehicles.

I claim as my Invention:

1. A vehicle seat mounted for upward and downward movement on a resilient suspension, and a clamping device at each side of the seat operative to clamp different intermediate portions of a floor mounted seat belt to the seat with a force sufficient to hold the belt taut across a seat occupant whilst permitting the portion of the belt between the clamping device and the floor mount to be alternately tight and loose as the suspension moves up and down.

2. A seat as claimed in claim 1 wherein each said clamping device comprises a spring-loaded clamping bar arranged to extend across the belt.

3. A vehicle seat as claimed in claim 2 wherein said clamping bar provides a clamping surface along its length which is greater than the width of said seat belt.

4. A seat as claimed in claim 1 wherein each said clamping device comprises a pair of opposed clamping members each positioned to lie adjacent a respective face of the belt, and means biasing the clamping members relatively together.

5. A seat as claimed in claim 4 wherein the clamping members comprise a pair of substantially parallel clamping bars slidably mounted at each end portion on screw means extending from a seat frame, and engaged with nut means, the biasing means comprises a spring interposed between an abutment and one of the clamping bars, and the screw means is rotatable relative to the nut means to vary the force exerted by the spring.

6. A vehicle seat as claimed in claim 1 wherein said clamping devices frictionally engage said seat belt with a force of approximately eight pounds.

* * * * *